United States Patent [19]

Evans et al.

[11] Patent Number: 5,495,294
[45] Date of Patent: Feb. 27, 1996

[54] SYNCHRONISING SIGNAL GENERATOR

[75] Inventors: Richard H. Evans, Lower Kingswood; Christopher Gandy, Croydon, both of United Kingdom

[73] Assignee: British Broadcasting Corporation, London, United Kingdom

[21] Appl. No.: 199,264

[22] PCT Filed: Jun. 18, 1993

[86] PCT No.: PCT/GB93/01296

§ 371 Date: Feb. 28, 1994

§ 102(e) Date: Feb. 28, 1994

[87] PCT Pub. No.: WO94/01965

PCT Pub. Date: Jan. 20, 1994

[30] Foreign Application Priority Data

Jul. 3, 1992 [GB] United Kingdom ............... 9214196

[51] Int. Cl.$^6$ ................................... H04N 5/12
[52] U.S. Cl. .................... 348/536; 348/542; 348/546
[58] Field of Search ........................ 348/536, 537, 348/540, 541, 542, 546, 547, 548, 524; 331/1 R, 20, 11, 17; H04N 5/12

[56] References Cited

U.S. PATENT DOCUMENTS

| | | |
|---|---|---|
| 4,228,461 | 10/1980 | Weissmueller . |
| 4,740,999 | 4/1988 | Wagner . |
| 4,847,678 | 7/1989 | McCauley ........................ 348/537 |
| 5,005,079 | 4/1991 | Satomi ............................. 348/536 |
| 5,036,293 | 7/1991 | Aschwanden . |
| 5,181,115 | 1/1993 | Flamm et al. .................... 348/537 |
| 5,331,347 | 7/1994 | Wu .................................. 348/536 |

FOREIGN PATENT DOCUMENTS

| | | |
|---|---|---|
| 0070603 | 1/1983 | European Pat. Off. . |
| 0218406 | 4/1987 | European Pat. Off. . |
| 0266147A2 | 5/1988 | European Pat. Off. . |
| 0289322A2 | 11/1988 | European Pat. Off. . |
| 2458186 | 6/1979 | France . |
| 0329576A1 | 8/1989 | France . |
| 2083721 | 3/1982 | United Kingdom . |
| 2202701 | 9/1988 | United Kingdom . |

OTHER PUBLICATIONS

British Broadcasting Corporation Research Department Report "Radio–Cameras: The development of radio systems for portable cameras used in television production," C. Gandy, 1991.

Primary Examiner—Victor R. Kostak
Assistant Examiner—Michael H. Lee
Attorney, Agent, or Firm—Robert F. O'Connell; Kevin J. Fournier

[57] ABSTRACT

A synchronizing signal separator receives synchronizing signals from a remote source. A window generator opens a window for a period and a counter regenerates synchronizing signals detected when the window is open. Detection of an incoming synchronizing signal when the window is open causes a window counter to be stopped to reduce the window duration to approach a set minimum width. The window generator and the counter are controlled by a voltage controlled oscillator whose oscillation frequency varies according to a feedback signal derived from the sense of the phase error between an external counter of the window generator and the regeneration counter.

15 Claims, 4 Drawing Sheets

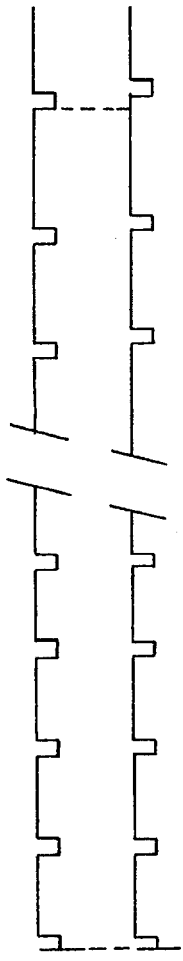
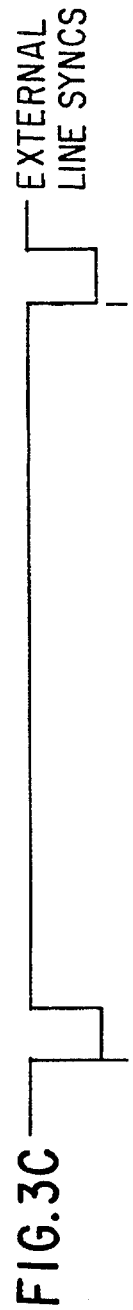
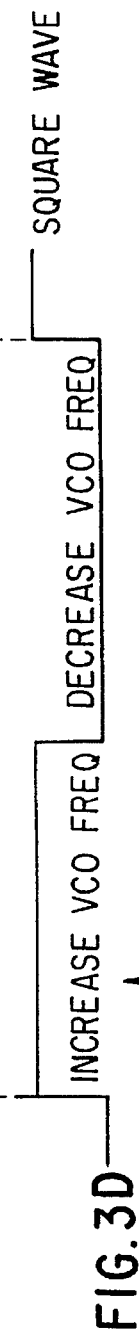
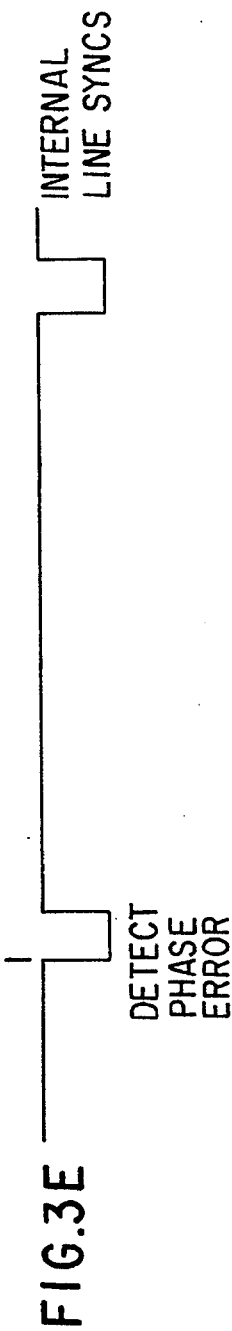

SYNCHRONISING SIGNAL GENERATOR

FIELD OF THE INVENTION

This invention relates to the acquisition and regeneration of synchronising signals in a received communications signal having a repetitive synchronisation signal.

BACKGROUND TO THE INVENTION

The invention will now be described and discussed in terms of one type of repetitive signal, a video signal. However, this should not be considered limiting and is for ease of understanding only. It is to be understood that the invention is applicable to any signal which includes a repetitive synchronisation signal.

Synchronisation signal separators (sync. separators) are widely used in many types of video equipment, for example in video synchronisers which introduce a delay into the incoming video signal in order to synchronise it with other video sources. Video synchronisers perform well with good quality video signals, but their performance is less successful with noisy video such as may occur when processing signals from radio-cameras. Examples of such radio-cameras are described in BBC Research Department Report 1991/15 entitled 'The Development of Radio Systems for Portable Cameras Used in Television Production' by C. Gandy. Television signals received from these mobile cameras using microwave links are often of variable quality due to noise and signal loss. This causes problems for video synchronisers, in particular their sync. separator circuitry. Existing sync. separators have been found to be inadequate, as they are prone to losing the lock on the signal in conditions of severe noise, rather than 'flywheeling', a condition in which the sync. separator would generate its own sync. signals without reference to the incoming syncs. Moreover, in the known apparatus, the frequency of the flywheel decays as the control voltage held on a capacitor gradually discharges. Thus, the timing of the sync. signals generated during flywheeling becomes progressively more inaccurate.

A further disadvantage of existing sync. separators is that they can only operate with standard level video signals such as are generated under studio conditions. The noisy environments in which radio cameras operate mean that standard level signals are often not produced.

SUMMARY OF THE INVENTION

The present invention aims to overcome the disadvantages mentioned above. The invention also aims to provide a sync. separator which may be used for any type of signal which includes repetitive synchronising signals and which is transmitted in a channel of variable quality The invention is defined in the independent claims to which reference should be made.

Preferred and advantageous features of the invention are defined in the dependent claims.

A preferred embodiment of the invention, once it has locked on to the signal can operate even in the event of short but total losses of incoming sync. signals, such as can occur in the event of multipath propagation. It also has the advantage of being able to tolerate longer periods of degraded syncs than prior art separators.

In one embodiment, the separator can recognise the difference between odd and even television fields enabling use with switching type radio cameras.

BRIEF DESCRIPTION OF DRAWINGS

An embodiment of the invention will now be described, by way of example only, and with reference to the accompanying drawings, in which:

FIGS. 3A–3E are timing diagrams explaining the operation of the phase comparator.

DESCRIPTION OF BEST MODE

The preferred embodiment is used in connection with video signals, and in particular PAL standard signals. However, the invention is applicable to any signal containing a repetitive synchronising component. In the video application, the invention is applicable to any signal format including, for example, NTSC, SECAM and MAC as well as PAL.

The PAL signal comprises 25 frames of video information per second, each frame comprising 625 lines arranged in a 2:1 interlace. The period of each line is therefore 64 µs. Each line includes a synchronising pulse lasting 4.7±0.2 µs, sent at the beginning of the line in a line blanking interval during which no active picture information is present. Of the 625 lines of each frame, 50 carry no active picture information and make up two field blanking intervals. The video lines in these intervals carry additional field synchronising pulses on 2.5 lines, each pulse having a width in the order of 27.3 µs. The line and field synchronising pulses, (herein after referred to as sync. pulses) enable synchronisation of the receiver with the video source.

Figure 1:
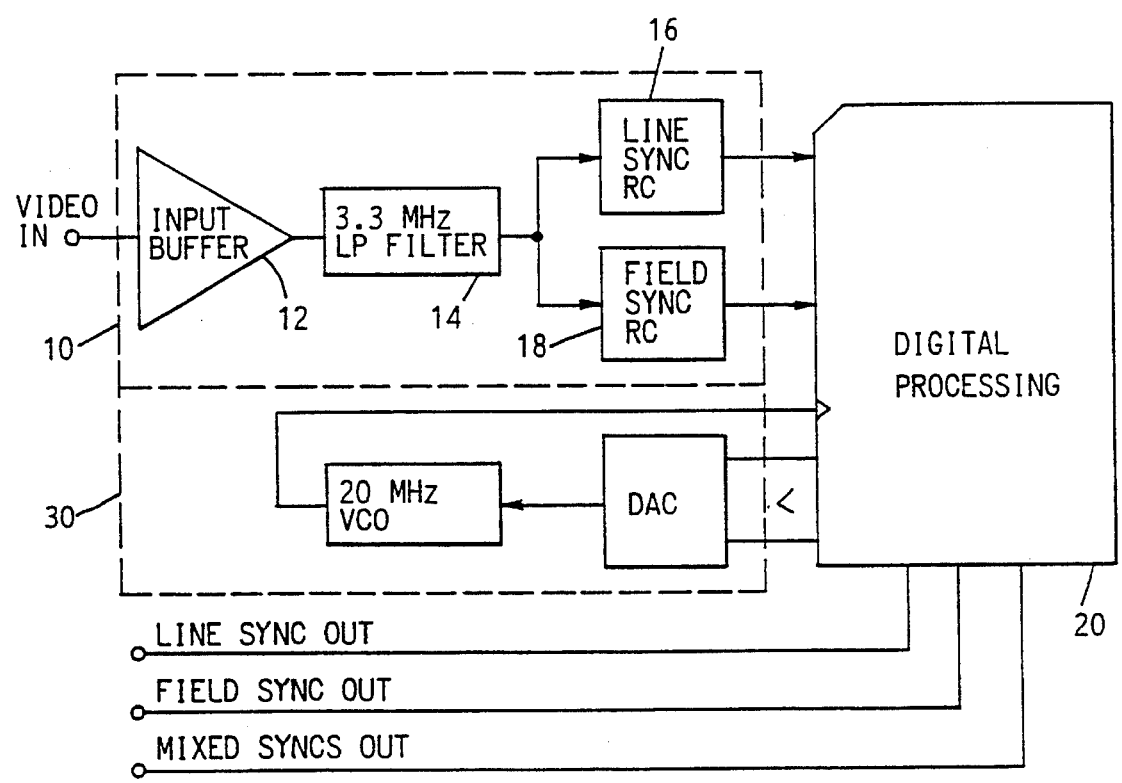
FIG. 1 is a general block diagram of a sync. separator embodying the invention.
Figure 2:
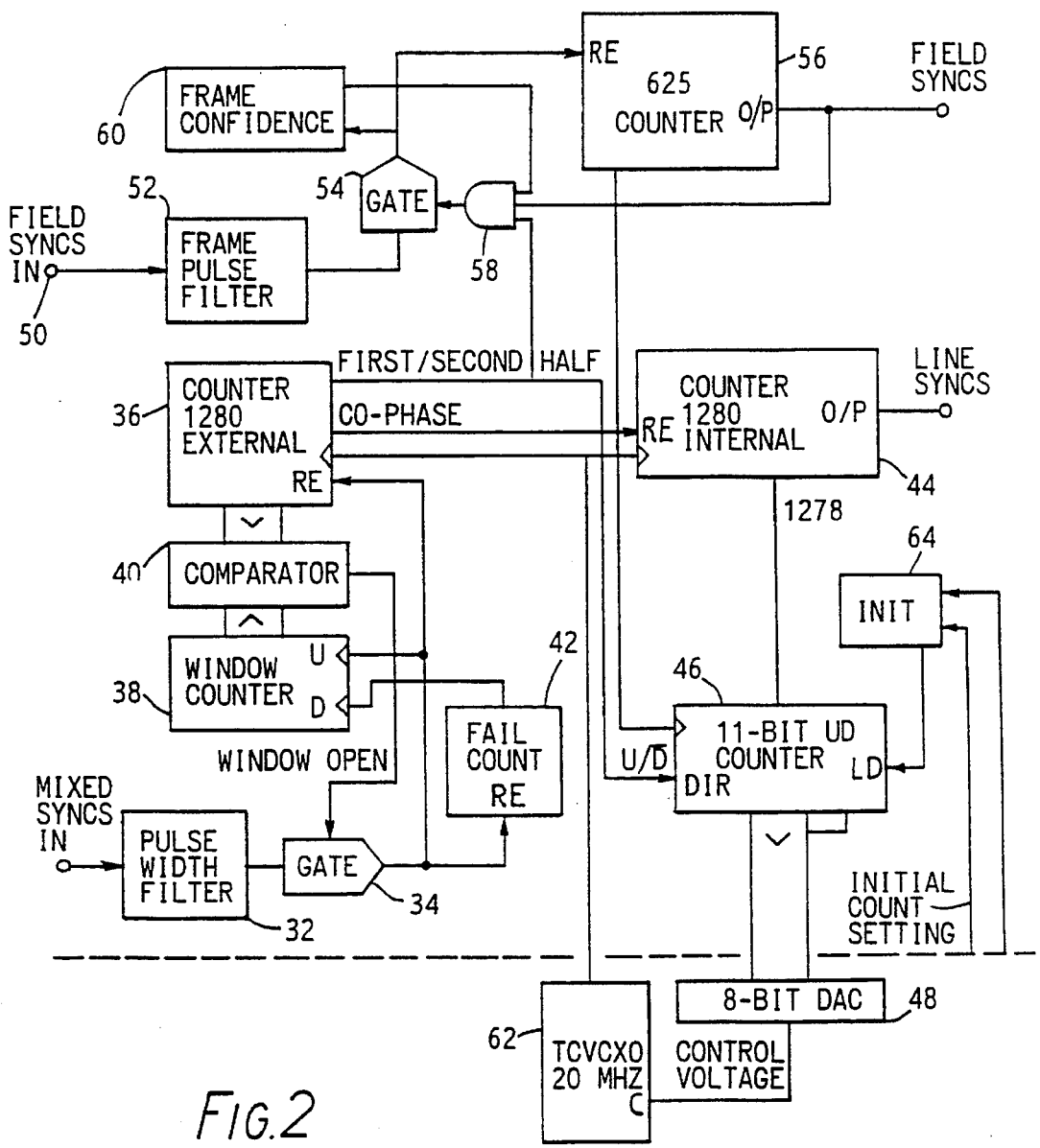
FIG. 2 is a more detailed block diagram of the digital processing and VCO of the sync. separator.

The sync. separator shown in FIGS. 1 and 2 is intended principally for use with microwave video links, although its use is not limited thereto as mentioned. In essence, sync. pulses from a video source are received, locked onto and then regenerated for the outgoing signal.

The sync. pulses produced by the flywheel sync. separator of FIGS. 1 and 2 are generated by digital counters, which divide down a high frequency oscillator (the voltage controlled oscillator VCO) running at a nominal 20 MHz. The line sync counters divide the VCO frequency by 1280 to give 15,625 Hz, the line frequency, and the field sync. counter divides this further to give 50 Hz and 25 Hz, the field and frame frequencies respectively. The sync. pulses derived from the incoming video signal are used to reset these counters so that the outgoing syncs are co-timed (i.e. in phase) with those of the incoming video signal. An adaptive windowing system ensures that counters are reset only by genuine incoming syncs and rejects mistimed pulses caused by noise.

Once the incoming and outgoing syncs are approximately in phase, a frequency locked loop adjusts the frequency of the VCO to an integer multiple of the frequency of the incoming syncs so that the outgoing syncs are running at the same rate as the incoming video. However, the VCO is controlled via a DAC so that in the event of loss or degradation of the incoming video signal, the control voltage can be held constant, and therefore, steady, correctly phased outgoing syncs will continue to be produced by simple division of the VCO frequency. In these circumstances, the sync. separator is operating in "flywheel" mode.

The circuit of FIG. 1 comprises an analogue sync. separator 10, a digital windowing and frequency division circuit 20 and a VCO and its control circuitry 30.

The input video signal, received, for example from a radio camera, is first buffered by input buffer 12 to provide isolation and then low pass filtered, for example, to 3.3 MHz by low pass filter 14. The low pass filter may be a VS 331 H filter sold by Matthey Limited. The high frequency components of the video signal provide little sync. information and in the absence of such a filter could upset the operation of later stages. The line and field syncs are then separated, using discrete component circuits with appropriate time constants, and fed to Schmitt trigger gates to speed up the edge transition times. TTL 7414 devices are suitable for these Schmitt triggers. The line and field sync. separators are shown as "Line Sync RC" 16 and "Field Sync RC" 18 in FIG. 1.

Referring now to FIG. 2, the separated line sync. pulses enter the main digital processing section where they are filtered by a pulse width filter 32 to remove short rogue pulses of less than about 4 µs. A 4.7 µs line sync. pulse shortened by noise may not get through this filter but this will not cause any problems; it is better to reject legitimate pulses distorted in this manner than to admit false pulses which are wholly generated by noise.

The pulses then enter the line-sync windowing circuit via a sampling gate 34. Here, an incoming line sync. pulse resets a 64 µs cycle-time "external" counter 36, which opens the window by setting one of the inputs to gate 34 to a logical high level towards the end of its count, to allow the next sync. pulse through; this initiates the cycle as the output from the gate 34 resets the 1280 step external counter 36. The counter is clocked at 20 MHz by VCO 62 and steps from 0 to 1279. Thus, one cycle is completed every 64 µs. At start up, the window is fully open, but as each successive line sync. pulses is admitted, the window progressively narrows (i.e. its duration decreases). If the window does not admit a pulse (either because of noise, multipath distortion, or due to a previously erroneous pulse) the window slightly widens again. We consider that for best performance, the windowing function should close more easily than it opens. This narrowing with every successfully admitted pulse continues until the window reaches a minimum duration. Using a clock frequency of 20 MHz, the window duration can change by up to 50 ns per line and therefore it can take only a few milliseconds to close the window completely, depending on the quality of the video signal.

For the 20 MHz system, a minimum window duration of about 200 ns is suitable. Only the leading edge of the synchronising pulse need fall within the window; the line sync. pulse width is, of course, much larger than the window.

The windowing circuit comprises the 1280 step counter 36 together with a window counter 38, comparator 40 and fail counter 42. The comparator 40 compares the value reached by the 1280 step counter 36 with a count value indicating the onset of the window held in the window counter 38. When the two are equal, the comparator outputs a window open signal to gate 34. As well as resetting the 1280 step counter 36, the output from gate 34, which indicates a sync. pulse within the window, increments the window counter 38 to reduce the window duration. If the fail counter 42 is not reset by a line sync pulse it reaches a value (e.g. 65 µs) at which it produces a pulse to indicate no line sync. It will decrement the window counter to reduce the duration of the window. The relationship between speed of opening and closing the window may be varied by varying the modulus of the fail counter.

The windowing process should remove any erroneous pulses, causing the counter 36 to reset at almost exactly 64 µs (or 1280 pulses of the 20 MHz clock), and the resetting therefore has little effect for most of the time. This "external" counter is then in phase with the external line syncs received from the signal source such as the camera.

Another counter 44 also cycling at 64 µs and similarly clocked by the 20 MHz VCO represents the internal line syncs, and governs the timing of the outgoing syncs. At the start of each phase measurement period (which lasts 2 frames) this counter is brought into phase with the external line sync. counter 36. During the phase measurement period the internal counter is allowed to run freely while the external counter is reset approximately every 64 µs by the incoming line syncs. This leads to a progressively increasing phase error between the incoming syncs and the outgoing syncs derived from the VCO 62. Towards the end of the phase measurement period this will accumulate to give a measurable difference. The sense of the error (lead/lag) is detected at the end of each phase measurement period, and this result used to increment/decrement an 11 bit up/down counter 46, the 8 MSBs of which form the input to a DAC 48. The output of the internal counter 44 provides the outgoing sync. pulses. The phase comparator uses a square wave derived from one of the line sync counters, (in this case the external one), which changes from a logical low to a logical high level at the start of the line, and changes back again half way along the line. This square wave is used as the direction control for the up-down counter 46 which drives the DAC, which in turn controls the frequency of the VCO.

At the end of each phase measurement period, a line sync. pulse from the internal line sync. counter clocks the up-down counter 46 once, and the sense of the up-down control at this exact moment determines the direction in which the counter changes. For the example shown in FIG. 3, the internal line sync. pulse arrives after the square wave has gone high. Because the two line sync. counters were reset together at the start of the phase measurement period and the pulse from the internal line sync. counter arrives late, then the frequency of the VCO needs to be increased if the frequency of the internal syncs is to match that of the external syncs.

When enabled, the phase comparator repeatedly corrects the phase error by adjusting the digital value presented to the DAC and hence adjusts the VCO control voltage.

The mixed syncs signal from the analogue sync. separator 10 is integrated using a simple RC time constant and applied to a Schmitt input gate 18 to produce a pulse during each field interval. This is then fed to the digital pulse processing section 20 where it is first filtered 52 to remove multiple edges caused by the broad pulses of the field interval. It is then passed to a counter 56 cycling every 625 lines. An incoming field pulse 50 from the analogue sync. separator may reset this counter but only if it is passed by the field gate 54 which is controlled by the field windowing circuit 56, 58, 60.

It is necessary to distinguish between odd and even fields, and so the gate 54 is only opened for the first half of each line. Because of the nature of the field interval, the field pulse from field 1 (the odd field) will be admitted during the first half of the line, while the field 2 (even field) pulse which occurs during the second half of the line will be rejected. The field 1 pulses (or frame pulses since they occur once per frame) which are allowed through the gate affect the frame confidence counter 60. If a frame pulse arrives when the gate is closed, the confidence counter is decremented and if a frame pulse arrives when the gate is open, the confidence counter is incremented. Initially, the 625 line counter 56 is out of phase with the incoming video frame and the confidence counter is set to zero. When the confidence counter is at zero it causes the frame window to open fully, ie gate 54 is open for the first half of every line of the frame. Therefore a frame pulse will be admitted some time during the following frame, causing the counter 56 to reset. Admitting this pulse also causes the confidence counter to increment, and this in turn reduces the field window to only the first half of one line, that line being the one in which the frame pulse is expected to be received, 625 lines after the first pulse. Subsequent frame pulses are therefore also admitted and these increment the confidence counter further. The confidence counter sets the window fully open first halves of all lines) when the count is zero and open for just the one half line for all non-zero count values. For a consistently good quality video signal, the confidence counter will increase frame by frame until it reaches its maximum value and will then remain at that value until the incoming video signal deteriorates.

If the input video signal deteriorates or is lost, the counter 56 continues to cycle, giving out the appropriate field pulses. If for some reason, the initial video signal is replaced by a new video source of different phase, then the new field pulses (occurring when the gate is closed) will cause the confidence count to decrease, eventually fully opening the window and reacquiring frame lock once more. Therefore, once a reasonably clean video signal has established itself, the field identity (odd/even) and field sync timing are held for some time, irrespective of signal degradation.

The output of the DAC 48 controls the frequency of the VCO 62. While the quality of the video signal is good, the phase comparator continually adjusts the output frequency of the VCO to make the internally generated syncs match the external syncs derived from the incoming video signal. The VCO may be a Temperature Compensated Voltage Controlled Crystal Oscillator such as is sold by Total Frequency Control Limited of Storrington, West Sussex, England.

If the incoming video signal fails, the circuit must go into flywheel mode as quickly as possible in which case outgoing syncs continue to be produced despite the loss of incoming syncs. This means disabling the phase error detection process and fixing the input of the DAC 48, thereby holding the VCO at a constant frequency. This flywheel effect will hold the frequency constant with no decay whatsoever. There will always be a slight difference between the frequency of the flywheel syncs and that of the incoming video's syncs, which is limited only by the resolution of the frequency comparator and VCO control circuitry.

Switches are used to set the initial VCO frequency. On power up an initialiser 64 (FIG. 2) preloads the 11-bit counter 46 with an initial middle value set by the switches, which considerably reduces the time taken for the initial frequency lock. Also, by setting the DAC control voltage to this mid point, and tuning the VCO's frequency trim adjustment to give an accurate 15,625 Hz, the control system can be optimised for a fast initial lock.

Because the complete video sync. signal has several temporal components, the sync. separator circuit goes through various stages of "lock". The first stage is line phase correction which occurs within about one line (64 µs). As successive line syncs are received, the line sync. window narrows, and with a clean signal this takes only a few milliseconds. When the window becomes small enough, the phase comparator is enabled and frequency adjustment, and also field sync. adjustment begin. As previously stated, the field confidence counter takes many fields to achieve full confidence. Frequency adjustment can take several seconds, depending on the accuracy of the camera master oscillator and the initial setting of the VCO, so full lock is only achieved after several seconds, although the system produces reasonable line syncs after only one line of video.

The digital approach used here means that a variety of output pulses can be produced to 50 ns resolution. The main outputs are Line Sync. and Even Field. The full field blanking interval with broad and equalising pulses can be produced for driving picture monitors with external sync. inputs. Any other useful output signals can also be produced such as Clamp(s), Active Picture, Field Drive, Mixed Blanking and line identification pulses.

One of the problems with current outside broadcast (OB) links is the use of frame synchronisers to enable picture sources (whether a radio camera or complete OB system) to run independently of station syncs, without the need for a genlock system.

A frame synchroniser is basically the combination of analogue/digital convertors and a digital memory array. The incoming video signal is digitised and written to the memory, and is then read from the memory some time later, in a cyclic manner. This delay synchronises the outgoing video with the local or "station" syncs. If the quality of the incoming signal deteriorates, (typically due to problems with a microwave link) and its syncs become poor, the frame synchroniser will go into a fallback mode in which the synchroniser stops writing new video data to memory, so it will output a still picture (or it will switch to black) until the signal quality improves. This usually means that the last picture held in its memory is a very poor one, often with chunks of video shifted horizontally or vertically, e.g. athletes feet appearing at the top of the picture. The effect of showing a still picture until the signal quality improves is rather annoying to the viewer, and can give the impression that the pictures are recorded.

This flywheel sync. separator embodiment described may be modified to produce a device which actually removes existing syncs and replaces them with the digitally generated syncs produced by counters 44 and 56. This would allow the frame synchroniser to continue passing video signals no matter what the quality, even to below 0 dB signal to noise ratio for a short length of time. A successful flywheel sync. separator and reinserter could be incorporated into commercial frame synchronisers.

Figure 4:
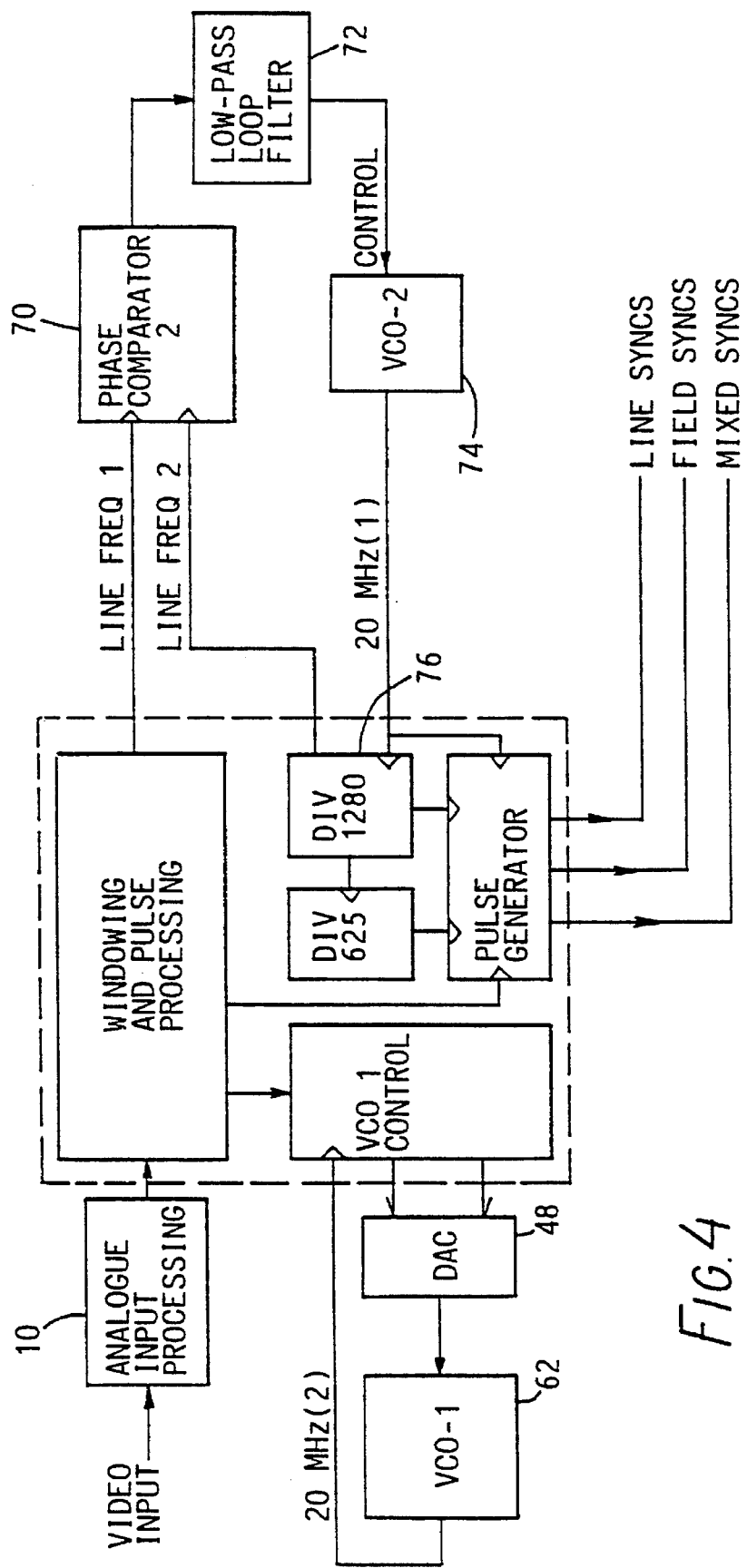
FIG. 4 illustrates a further embodiment of the invention.

Referring to FIG. 4, Because the 20 MHz VCO-1 62 runs asynchronously with respect to the incoming video syncs, the falling edge of the sync pulse which defines the line start is unlikely to be coincident with the falling edge of one of the 20 MHz clock cycles. This uncertainty leads to a small (approximately 100 ns pk-pk) timing jitter on the regenerated sync. edge and when the regenerated syncs are combined with the original video, this is visually rather objectionable.

The jitter can be removed by feeding the line syncs, generated as described earlier, into a Phase Locked Loop (PLL). Referring to FIG. 4, the phase comparator 70, low-pass loop filter 72, VCO-2 74 and "Div 1280" divider 76 form such a PLL. The line sync. pulses from the main digital processing section 20 are fed into the second phase comparator 70 and their timing is compared with that of the phase of Line freq 2 which is similarly derived by dividing down a 20 MHz VCO by another 1280 modulus counter 76. This causes the Line freq 2 signal to accurately track the mean frequency of line freq 1 but by choosing appropriate low pass loop filter characteristics, the phase changes of Line Freq 1 are followed more slowly and the jitter is therefore averaged out. In this dual—VCO/PLL implementation, it is the 'smoothed' line pulses which are used to generate the outgoing line syncs, and by further frequency division, the vertical sync. pulses: field syncs, and mixed syncs.

The sync. separator described has been found to work well. Once it has become locked to a reasonably clean signal, the internal counter will be running at a frequency very close to the line frequency of the incoming video signal. It can therefore flywheel in the absence of video, or in the presence of noisy video. The circuitry described may be implemented in hardware either as discrete components or on a dedicated IC for a large part of the circuitry. However, various of the functions could be realised in software and in that case the foregoing description should be treated as a description of the functions the algorithm performs.

We claim:

1. A method for regenerating synchronising signals from a received communications signal including a repetitive synchronising signal, comprising separating synchronising signals from the received signal, repeatedly opening a timing window having a given duration, detecting received separated synchronising signals occurring when the timing window is open, generating a fresh synchronising signal in response to detection of a received synchronising signal when the window is open, and progressively closing the window by reducing the time for which the window is open to a predetermined minimum on repeated detection of received synchronising signals when the window is open.

2. A method according to claim 1, comprising opening the window by increasing the time for which it is open upon failure to detect a received synchronising signal.

3. A method according to claim 2, wherein the rate of opening the window is lower than the rate of closing the window.

4. A method according to any preceding claim, comprising filtering the separated synchronising signals to remove signals having a duration shorter than a second predetermined minimum.

5. A method according to claim 1, wherein the generation of the window and of the fresh synchronising signals is controlled by an oscillator, comprising regulating the oscillator frequency in response to detected differences between the phase of received synchronising signals detected when the window is open and the phase of the fresh synchronising signals.

6. A method according to claim 1, wherein the signal is a video signal and the synchronising signals are line synchronising pulses, the method further comprising separating field synchronising signals from the received signal, opening a further timing window having a given duration, detecting received separated field synchronising signals occurring when the further window is open, varying a level of confidence from detection of field synchronising signals, varying the duration of the further timing window in accordance with the level of confidence and deriving from the confidence level a memory of the success or failure of previous detections.

7. Apparatus for regenerating synchronising signals from a received communications signal including a repetitive synchronising signal, comprising means for separating synchronising signals from the received signals, means for repeatedly opening a timing window having a given duration, means for detecting received separated synchronising signals occurring when the timing window is open, means for generating a fresh synchronising signal in response to detection of a received synchronising signal when the window is open, and means for progressively closing the window by reducing the time for which the window is open to a predetermined minimum on repeated detection of received synchronising signals when the window is open.

8. Apparatus according to claim 7, comprising means for progressively increasing the time for which the window is open upon repeated absence of received synchronising signals during times when the window is open.

9. Apparatus according to claim 7, wherein the means for opening the window comprises a gate, and counting means, the counting means being coupled to the gate to open the gate for a predetermined count.

10. Apparatus according to claim 9, wherein the counting means comprises a first periodic counter, a comparator and a second window counter, wherein the window counter defines the range of values of the periodic counter for which the gate is open.

11. Apparatus according to claim 10, wherein the means for progressively opening the window and the means for progressively closing the window comprise means for incrementing and decrementing the window counter.

12. Apparatus according to claim 7, wherein the means for generating fresh synchronising signals comprises a third counter having a periodic count identical to that of the first periodic counter.

13. Apparatus according to claim 10, comprising an oscillator for driving the first and third counters.

14. Apparatus according to claim 13, comprising means for varying the oscillation frequency of the oscillator in response to a determination of the sense of the phase error between the first and third counters over a predetermined period.

15. Apparatus according to claim 7, wherein the communications signal is a video signal and the synchronising signals are line synchronising signals, comprising means for separating field synchronising signals from the received video signal, means for opening a further timing window having a given duration, means for detecting received separated field synchronising signals occurring when the further window is open, means for varying a level of confidence from detection of valid field synchronising signals and means for varying the duration of the further window in accordance with the level of confidence.

\* \* \* \* \*